T. Molinier,
Dressing Staves.
№ 4,966.   Patented Feb. 10, 1847.
3 Sheets-Sheet 3.
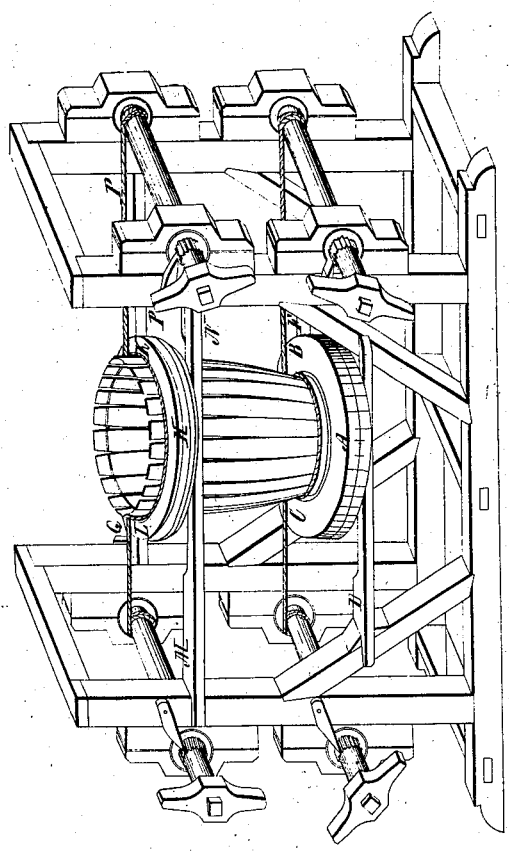
Witnesses:
Inventor:

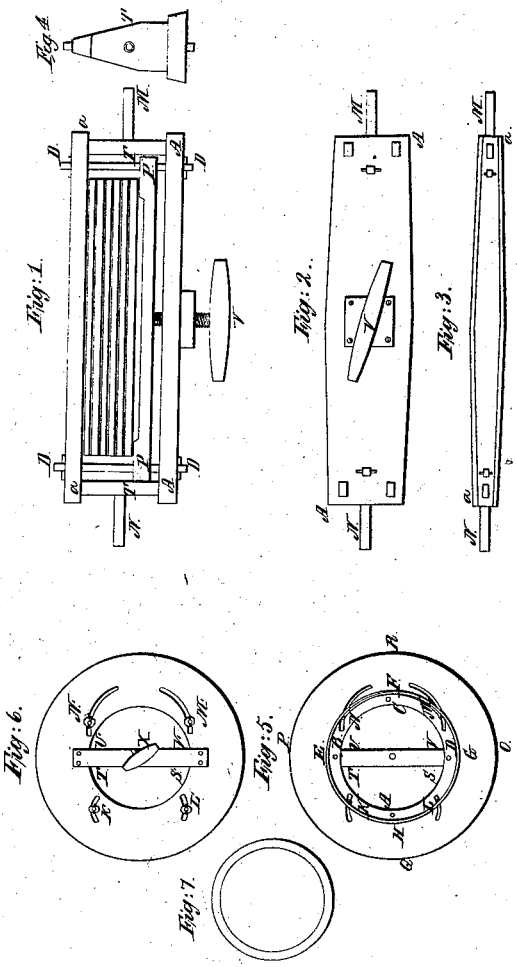
T. Molinier,
Dressing Staves.
Nº 4,966.   Patented Feb. 10, 1847.

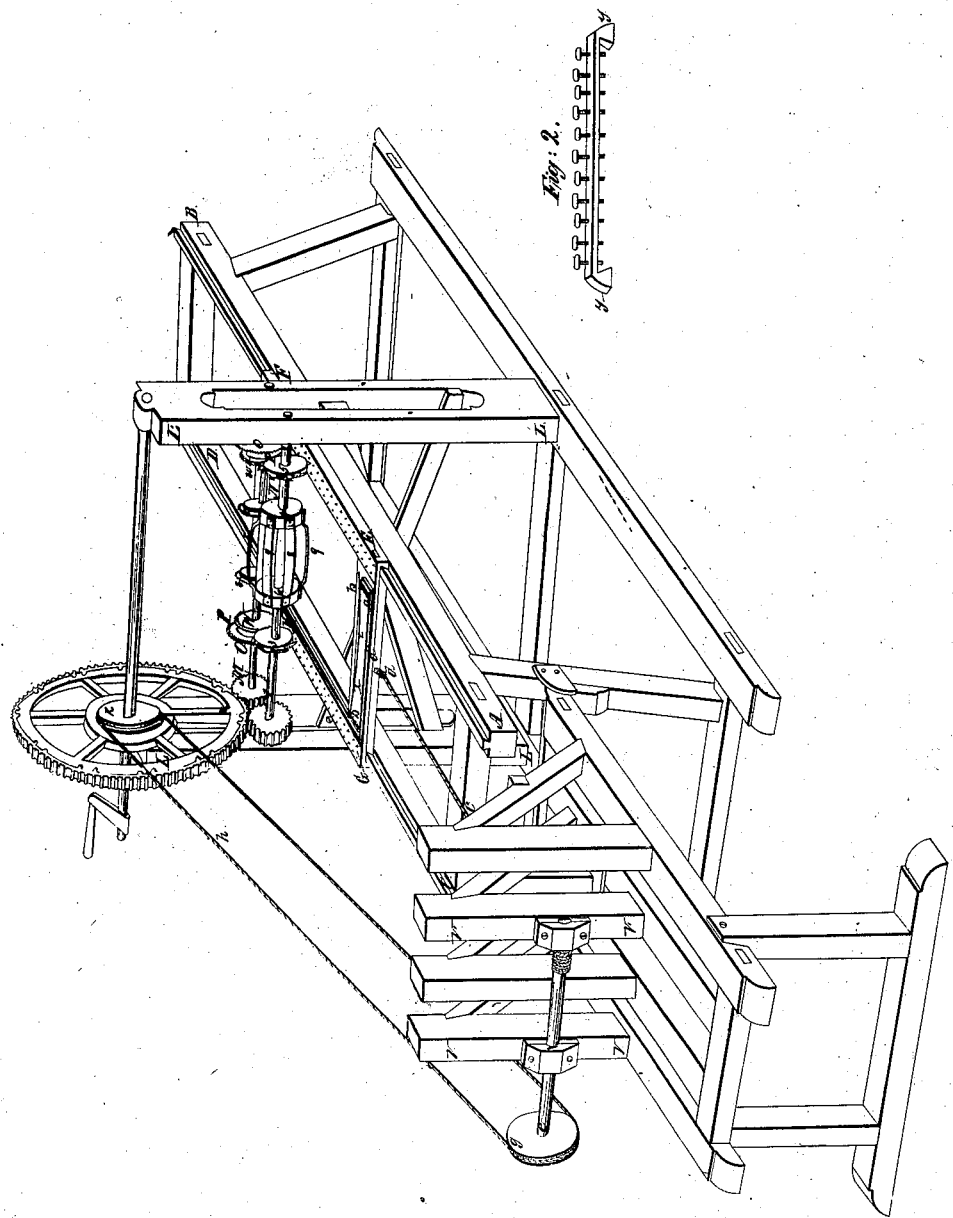

UNITED STATES PATENT OFFICE.

T. MOLINIER, OF NEW ORLEANS, LOUISIANA.

BARREL MACHINERY.

Specification of Letters Patent No. 4,966, dated February 10, 1847.

*To all whom it may concern:*

Be it known that I, T. MOLINIER, from France, resident of the State of Louisiana, have invented a new and useful Machine for Making Barrels, Hogsheads, and Cooperage Generally, which I call "Mechanical Cooperage-Machine;" and I do hereby declare that the following is a full, clear, and exact description of the construction and operation of the same, which is composed of three distinct parts, reference being had to the annexed drawings, making a part of this specification, in which—

Sheet No. 1, Figure 1, is a view of the first part, (the press for preparing the staves in their length;) Sheet No. 2, Fig. 1, is a perspective view of the second part (the machine for preparing completely the staves taken from the press); Sheet No. 3, is a perspective view of third part (the forming or making up of the barrel with staves prepared with parts first and second).

*Construction of part first. The press for preparing the staves in their length.*—A A, Sheet No. 1, Fig. 2, is a staff exactly cut, having absolutely the shape and form of a staff which is to be employed immediately for making up a barrel. *a a*, Sheet No. 1, Fig. 3, is a staff exactly cut, having absolutely the shape and form of a staff which is to be employed immediately for making up a barrel. Those two model staves A A and *a a* are held parallel by their ends by the cross-pieces T, T, (Fig. 1) (the cross-pieces T, T are similar and equal, and Fig. 4 is a view of one) in such way that the lateral cut or sloping cut of the small model staff *a a*, be the continuation of the lateral cut or sloping cut of the large model staff A A, in all its length and on each side.

Between those two model staves so maintained the wooden part P P (Fig. 1), slides on two rods D D, D D, which also go through the two model staves at their ends; said rods leaving between themselves a space longer than a staff of a required length. Moreover, the object of those two rods is to govern the part P P, while obeying to the action of the screw V, placed in the middle of the large model staff A A. Those two model staves A A and *a a*, must be covered on their lateral cuts with pieces of hard and polished metal, in order that the working may not alter the shape and sloping cut of said model staves. A A is wider, and *a a* is narrower, than a staff of a required dimension in order that the staves prepared in the press be of convenient width.

*Operation of the said press.*—The press being established in such way that it can revolve on itself by means of the pivots M and N, its heaviest side will go down, and the screw V being withdrawn sufficiently, the part P P will touch the large model staff A A. Now, fill the space comprised between the part P P and the small model staff *a a*, with staves previously flattened, taking care to place the widest ones near the large model staff, in order to lose the least possible quantity of wood and squeeze with the screw; make the press revolve on itself until it comes to the position shown by Fig. 1, where it will be maintained by any support placed under it; then, with a double-handled, flat, and rectilineal two-edge knife, cut on the staves held in the press all that runs past the two model staves A A and *a a;* either pushing the knife forward or drawing it to you, until the not-edged ends of the knife slide on the whole length of the metal cover of the model staves, when the edge of the blade can no more cut the wood. The staves being prepared on that side, operate in the same way on the other side and you will have staves exactly prepared on both sides in their length. Such is the first operation made on the staves.

*Construction of part second. The machine for preparing completely the staves taken from the press.* Sheet No. 2, Fig. 1.— The inferior parts of the machine which bear no letters are mere supports which can be constructed in different ways, and which have no other object than to hold the other parts of the machine at a convenient height; in consequence those inferior parts need no details of construction. On those supports is constructed the rectangular part A B C D, whose long sides A B, C D, (constructed of sufficient length) are held parallel by two or more cross-pieces, such as B D and its correspondent. Said long sides A B, C D, are furnished with a rail on which slides the rectangular part or car E F G H. Both long sides of car E F G H have in their under surface a notch or hollowing in their whole length, which notch or hollowing joints with the rails of A B C D. The object of those two rails is to govern the car E F G H. The upper-surface of the long sides of part E F G H is furnished with springs, the object of which will be seen in its proper place. On the two short sides G E, H F, there is a curve cut or projecture X Z and its correspondent, the two said cuts capable of receiving the lateral convexity or sloping cut of a staff. (The drawings do not allow the very distinct representation of those two curve cuts, but they show them as plainly as possible. The space between those two curve cuts can be calculated to receive the number of staves necessary for the confection or completion of a barrel of required size or to receive more staves than the number required for a barrel. The object of the pieces *a b, a b*, on side G E, and their correspondents on side H F, will be seen in its proper place.

V V, V' V', are two upright posts or supports, (which can even be stuck into the soil), the object of which is to bear the beam *e f* at the height of the point *d* where the rope *c d* of the beam *e f* is attached to the car E F G H. (Said point *d* also indicates a ring affixed to E F G H, which ring receives the hook affixed to rope *c d*.) The beam *e f* bears a pulley *g* which communicates by the rope *h* with the pulley *k* which is placed on the beam of the large wheel. The dimensions of the pulleys *g* and *k* are calculated to give the car E F G H a convenient rapidity. The large wheel catches in the two small wheels. Said three wheels offering nothing particular in their construction, I will avoid prolixity and merely say that they are made of iron, as well as their beams, which beams are held by the two supports L L, L' L'.

*First tool-beam.*—On the beam M N, near the two ends, are two circular saws O, O, one grazing the side E F, the other grazing the opposite side when E F G H slides on A B C D. Two circular twin-saws W, W, are placed on the same beam M N, on each side, near the saws O, O, from which they are equally distant. On the same beam M N are placed two circular saws S, S, equally distant from the twin-saws W, W, and leaving between themselves a required space. (The positions of all those saws on the beam M N depending on their functions on the staves, that is depending on the required length of the staves, will be seen in the part "operation.")

*Second tool-beam.*—On the beam 1, 2, on the circumference of the cast wheels 3 and 5, chisels of a convenient form are affixed, in sufficient number, said chisels corresponding to the space comprised between the twin-saws W on one side, and the twin-saws W on the other side. On the two cast wheels 6 and 4, knives of a convenient form are affixed, in sufficient number, said knives corresponding to the space comprised between the saws S, S. (The positions of the chisels and knives on the beam 1, 2, depend on the positions of the saws on the beam M N, as will be seen in the part "operation.") The wheels 3, 5, 6 and 4 must be either radius-wheels or parts constructed in convenient way, in order that the chisels and knives be affixed firmly by means of screw-nuts.

*Operation of part second.*—Loading of the car E F G H with staves prepared in the press: The car E F G H being withdrawn at the end B D of A B C D, place the first staff in such way that it fills exactly the curve cut X Z which will maintain it, and knock on both ends of the staff to make it stick to the springs. Now, as the angle of separation between two staves uniformly cut (as those prepared in the press) is always the same between two staves that touch at their middle and are placed in such manner that the lines which divide them in two equal parts in their length be parallel; having cut a coin that fills that angle exactly on each side, and that coin being placed against the first staff you can place the second staff with as much precision as the first, then the third staff &c., &c. The last staff must fill the curve cut corresponding to X Z. Then the car E F G H being loaded with staves so placed and catched in the springs, to prevent any change in their position by the action of the tools, you must place on those staves two rods *y y* Fig. 2, bearing against *a b, a b*, and against their correspondents on the cross-piece F H; and consolidate said rods with coins at their ends. Said rods *y, y*, are furnished in their length with screws capable of bearing on the staves which should not be sufficiently maintained. Coins can also be put under the rods *y, y*, to consolidate the staves, but the screws are sufficient for that purpose. Now the car E F G H is ready to pass under the revolving tools.

*First beam.*—Now, the large wheel being set in motion, (either by steam, horses or other force,) the rope *d c* coiling on the beam *e f*, and the car E F G H passing under the revolving tools the two saws O, O, will cut the staves, giving them a length determined by the width of E F G H, said width being equal to the required height of the barrel. The two twin-saws W, W, will give, near each end of the staff, two parallel cuts. The two saws S, S, will give two cuts, near the middle of the staff, on each side of the center, from which they are equally distant.

*Second beam.*—The chisels placed on the wheels 3 and 5, will empty the space comprised between the cuts produced on each side by the twin-saws W, W; it is the notch. The knives placed on the wheels 6 and 4 empty the space comprised between the cuts produced by the two saws S, S. This weakening of the staves in their center facilitates their curving or bending when necessary.

The saws on the first beam prevent the wood from cracking under the tools of the second beam. It is a matter of course that the tools of those two beams (excepting the two saws O, O,) must be placed at such height that they cut but the necessary quantity of wood, thereby not affecting the solidity of the staves.

The whole car E F G H having passed under the tools, and the rods y, y, being removed, you have on that car a number of staves completely prepared, sufficient to make a barrel of a required size. (It has been seen that the car E F G H can be calculated to receive the number of staves necessary or more than necesary for making a barrel.) Then nothing remains but to form or make up the barrel, which is the object of the third and last part.

*Construction of part third. Forming or making up the barrel.*—Sheet No. 3 represents the system of pressing-handles employed for this third part, which system offers nothing particular in its construction, it simply consists of a frame or scaffold solidly constructed, bearing four pressing-handles which are furnished with stopping notches; the two upper pressing-handles pulling the two ends of a rope, and the two inferior ones pulling the two ends of another rope. Said pressing-handles must be placed at convenient heights, in order that the ropes press at convenient heights near the ends, the barrel which is to be made up (as the drawings show).

The two cross-pieces M N, P Q, have the double object of contributing to the solidity of the construction and of bearing the ring L H K (whose object will be seen in the part "Operation."). The cross pieces M N, P Q, are affixed to the scaffold, that is they cannot be removed, and the ring L H K is affixed to M N, P Q. The cross-piece D E and its corespondent are removable, and their object is to bear C A B, whose object will be seen hereafter.

E H G F (Sheet No. 1, Fig. 5) is a spring-circle made of steel capable of bending on itself, that is, capable of diminishing in diameter always keeping its circular form. This spring-circle is maintained on the part O P Q R by pegs K, L, M, N, affixed on the interior of said spring circle and fastened on the other surface of O P Q R (as is seen at the points K', L', M', N', Fig. 6); each of those pegs being able to slide in the notch or cut in which it is placed. On the same part O P Q R (Fig. 5), within the spring-circle, at the points A, B, C, D, stand four equal pegs surpassing in length the width of the spring-circle, but equal in length to the space comprised between the notch on the end and the end of a staff. On those four pegs A, B, C, D, the head-piece of the barrel (represented by Fig. 7) is maintained by means of a screw-bladed-gimlet furnished with a screw-nut X, which screw-nut, bearing on the other side of T S V U (on T' S' V' U', Fig. 6) fastens the head-piece of the barrel on the four pegs A, B, C, D. From the length of those four pegs, it follows that the spring-circle can bend on itself behind the head-piece which has been fastened to said pegs.

Two similar systems of head-pieces are necessary for making up the barrel; one of the two having a ring C A B, said ring larger than the spring-circle and smaller than the upper-ring L H K, (as the model and drawing show.)

*Operation of part third.*—The ring-system C A B, furnished with the head-piece of the barrel, being placed on the cross-pieces D, E, F G, cross the ropes, one on the ring C A B (which will bear it at the required height), the other on the ring L H K (which will bear it at the required height); then place the staves vertically in such way that their basis be comprised between the spring-circle and the ring C A B; the upper ends of the staves leaning against the upper-ring L H K, said staves will make an opening increasing from bottom to top. The other system bearing the upper-head-piece being now placed on the upper-extremities of the staves, any falling of the staves become impossible during the remainder of the operation. Now, by the action of the two inferior pressing handles (which are governed by the stopping-notches in order to maintain the barrel in a vertical position) the circle made by the basis of the staves diminishes under the effort of the rope, the spring-circle resisting only enough to maintain the staves in a circular position. At this moment the notches of the staves form around the head-piece of the barrel and at a height corresponding with the edge of that head-piece, a circular hollowed line which gradually diminishes in diameter. Now press a little with the upper-handles to give the staves some steadiness. If the staves, in their gathering, obey uniformly to the action of the ropes, that action being continued, the two circular hollowed lines made by the notches of the staves at the height of the two head-pieces, will gradually diminish in diameter, and will terminate in catching the two head-pieces of the barrel. It will be the general case.

If the staves do not obey uniformly to the action of the ropes, remove the upper head-piece system and correct the irregularity; then put back the head-piece system, and operate as has just been said. This will very seldom occur, any irregularity being an exception, and produced only by weakeness of the spring-circles.

When the head-pieces of the barrel are caught in the notches, the spring-circle of each head-piece is withheld by the ends of the staves, in consequence of the position of said staves.

*Manner of removing the two systems of head-pieces.*—Upper head-piece: Withdraw the gimlet until it abandons the head-piece of the barrel; then, by means of the pegs, force the spring-circle to bend a little more, and (always holding the pegs) at the same time pull out, and the head-piece of the barrel remains bare. Then a hoop is put in the space left by the rope. Inferior head-piece: Remove, by drawing horizontally the two cross-pieces D E, F G, and operate for all the balance, as for the upper head-piece. Put the hoop, slacken the two ropes and the barrel will fall down completely made.

The nature of my invention consists in making cooperage generally by a mechanical process.

The character of my invention consists in performing simultaneously and rapidly several operations which are made but successively in cooperage.

What I claim as my invention and desire to secure by Letters Patent are the following parts:

1. The combination of the revolving tools with the carriage for preparing completely the staves taken from my press, that is, for giving said staves a required length, making their notches and emptying their center; said revolving tools effecting simultaneously those three operations.

2. The two parts that I call "System, of head-pieces," as herein described; which systems hold the head-pieces of the barrel at the height of the notches with a mathematical precision, during the pressing; said "Systems of head-pieces" being furnished with spring-circles which govern the staves and maintain them in a convenient position for the forming or making up of the barrel.

T. MOLINIER.

Witnesses:
   CHAS. LE CARPENTIER,
   VALDIN BLACHE.